(12) United States Patent
Kumar et al.

(10) Patent No.: US 11,627,116 B2
(45) Date of Patent: Apr. 11, 2023

(54) SECURE COMPUTATION OF MULTIPARTY DATA

(71) Applicant: Fortanix, Inc., Mountain View, CA (US)

(72) Inventors: Ambuj Kumar, Sunnyvale, CA (US); Anand Kashyap, Los Altos, CA (US); Nehal Bandi, San Jose, CA (US)

(73) Assignee: Fortanix, Inc., Mountain View, CA (US)

( * ) Notice: Subject to any disclaimer, the term of this patent is extended or adjusted under 35 U.S.C. 154(b) by 387 days.

(21) Appl. No.: 16/806,685

(22) Filed: Mar. 2, 2020

(65) Prior Publication Data

US 2021/0273921 A1 Sep. 2, 2021

(51) Int. Cl.
| | |
|---|---|
| *H04L 9/40* | (2022.01) |
| *G06F 21/53* | (2013.01) |
| *G06F 21/57* | (2013.01) |
| *H04L 9/32* | (2006.01) |
| *G06F 21/60* | (2013.01) |
| *G06F 21/10* | (2013.01) |

(52) U.S. Cl.
CPC .......... *H04L 63/0428* (2013.01); *G06F 21/10* (2013.01); *G06F 21/53* (2013.01); *G06F 21/57* (2013.01); *G06F 21/602* (2013.01); *H04L 9/3234* (2013.01); *H04L 9/3247* (2013.01)

(58) Field of Classification Search
CPC . H04L 63/0428; H04L 9/3234; H04L 9/3247; G06F 21/10; G06F 21/53; G06F 21/57; G06F 21/602
See application file for complete search history.

(56) References Cited

U.S. PATENT DOCUMENTS

| | | | |
|---|---|---|---|
| 2012/0159184 A1* | 6/2012 | Johnson | G06F 21/645 713/189 |
| 2018/0211067 A1* | 7/2018 | Costa | G06F 21/74 |
| 2018/0212939 A1* | 7/2018 | Costa | G06F 21/6209 |
| 2022/0012358 A1* | 1/2022 | Gaddam | H04L 9/14 |

OTHER PUBLICATIONS

Cisco, "Cisco Secure Enclaves Architecture", Retrieved From https://www.cisco.com/c/dam/en/us/solutions/collateral/enterprise-networks/secure-data-center-solution/whitepaper-c07-731204.pdf, Published Mar. 2014 (Year: 2014).*
Liu et al., "Practical and Efficient in-Enclave Verification of Privacy Compliance", 2021 51st Annual IEEE/IFIP International Conference on Dependable Systems and Networks (DSN), DOI 10.1109/DSN48987.2021.00052, Published 2021 (Year: 2021).*

* cited by examiner

*Primary Examiner* — Chau Le
(74) *Attorney, Agent, or Firm* — Lowenstein Sandler LLP

(57) ABSTRACT

Encrypted first data and encrypted second data may be received, where each data is from different client servers. A request to perform an operation with the first data and the second data may be received. Whether the operation is authorized to be performed with the first data and the second data at an enclave may be verified. In response to verifying that the operation is authorized to be performed with the first data and the second data at the enclave, the encrypted first data and the encrypted second data may be decrypted to the first data and the second data, respectively. Furthermore, the operation may be performed with the first data and the second data at the enclave.

17 Claims, 6 Drawing Sheets

SECURE COMPUTATION OF MULTIPARTY DATA

TECHNICAL FIELD

Aspects of the present disclosure relate generally to data computation, and more specifically, relate to secure computation of multiparty data.

BACKGROUND

An application can receive data from one server and another data from a different server. The application can compute output data using the received data from different servers. Each of the received data may be associated with a data policy restricting a usage of the respective data. For example, a data policy of the data received from one server may not allow the other server to access the respective data. Similarly, the other data received from the different server may also have the data policy restricting access to the data by the other server. In such an instance, the application cannot be executed on either server.

BRIEF DESCRIPTION OF THE DRAWINGS

The present disclosure will be understood more fully from the detailed description given below and from the accompanying drawings of various implementations of the disclosure.

DETAILED DESCRIPTION

Figure 1:
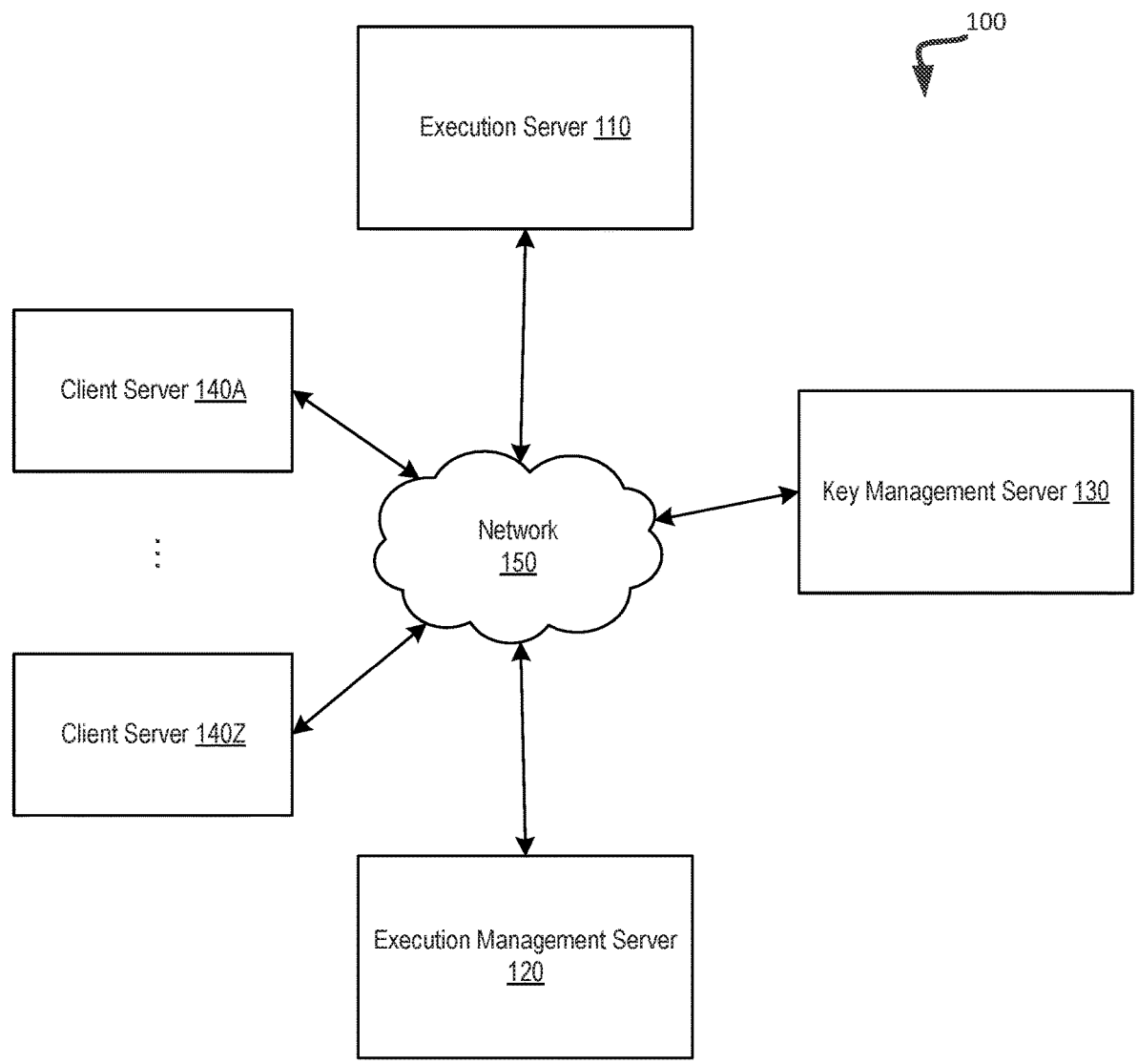
FIG. 1 illustrates an environment to provide secure computation in accordance with some embodiments of the present disclosure.

Aspects of the present disclosure relate to secure computation of multiparty data. The multiparty data used herein refers to multiple sets of data from different entities (e.g., different servers associated with different clients). One data set can be provided by a server of one client and another data set can be from a server of a different client. Although the clients may not want others to have access to their own data set, the clients may want to use each other's data set for a limited purpose such as performing a particular computation operation on the multiparty data. In order to perform such a computation, the clients may entrust a third party server to perform the computation. In this way, the clients can benefit from each other's data without compromising privacy of each other's data. However, there is no guarantee that the entrusted third party has performed the computation in a secure manner.

Aspects of the present disclosure address the above and other deficiencies by ensuring that computation of multi-party data is performed in a secure environment and performing the computation in such an environment. A secure execution server may be utilized to verify that a requested computation or operation of the multiparty data would be performed in a secure environment (e.g., an enclave) and after verification, perform the operation in the secure environment. For example, client servers can encrypt their own data and provide encrypted data to the secure execution server while providing the encryption keys to a key management server. One of the client servers may request secure computation or secure execution of an operation with data from other client server(s) to the secure execution server. In response, the secure execution server can create a secure environment or initiate an enclave for the requested operation. Subsequently, the secure execution server can communicate with an execution management server to verify that the operation is to be performed in the secure environment, using attestation data and a corresponding validation data. After the verification, the secure execution server can communicate with the key management server to obtain encryption keys for each data. Subsequently, the secure execution server can decrypt data and perform the requested operation in the secure environment. The client server(s) can request the execution management server, in addition or in the alternative to the secure execution server, that the operation be performed with the multiparty data in a secure environment. In response, the execution management server can provide attestation data that can later be used in the verification described above.

Advantages of the present disclosure include, but are not limited to, improved security for performing operations and an output of the operation. For example, the operation involving multiparty data may be performed in a secure environment (e.g., at an enclave) after verifying that the operation is authorized to be executed in such environment. In addition, because the operation is performed in the secure environment, an output of the operation may be stored in the secure environment.

FIG. 1 illustrates an example environment 100 to provide secure computation. In general, the environment 100 may include a secure execution server 110, an execution management server 120, a key management server 130, and client servers 140A-140Z connected via a network 150. The network 150 can correspond to a LAN, an intranet, an extranet, and/or the Internet. As shown in FIG. 1, the secure execution server 110, the execution management server 120, and the key management server 130 are connected to each other via the network 150. In some implementations, they may be supported by the same server. In other implementations, each of the secure execution server 110, the execution management server 120, and the key management server 130 can be a part of separate servers. Each system may correspond to a processing logic that may include hardware (e.g., processing device, circuitry, dedicated logic, programmable logic, microcode, hardware of a device, integrated circuit, etc.), software (e.g., instructions run or executed on a processing device), or a combination thereof. The providing of the secure computation of multiparty data is facilitated by a coordination amongst the secure execution server 110, the execution management server 120, and the key management server 130 as described in further detail below.

For example, the secure execution server 110 may execute an operation or perform computation of multiparty data in a secure environment after verifying that the secure computation is authorized to be performed. The execution management server 120 may manage the secure execution by providing the verification. The key management server 130 may manage encryption keys to be used in performing the secure execution. In some implementations, the execution management server 120 and the key management server 130 may perform operations in a secure environment. A client server 140A-140Z may correspond to a server or any device that may encrypt data and store the encrypted data. As illustrated in FIG. 1, the client server 140A-140Z can communicate with any of the secure execution server 110, the execution management server 120, and the key management server 130 for the secure computation of multiparty data.

Figure 2:
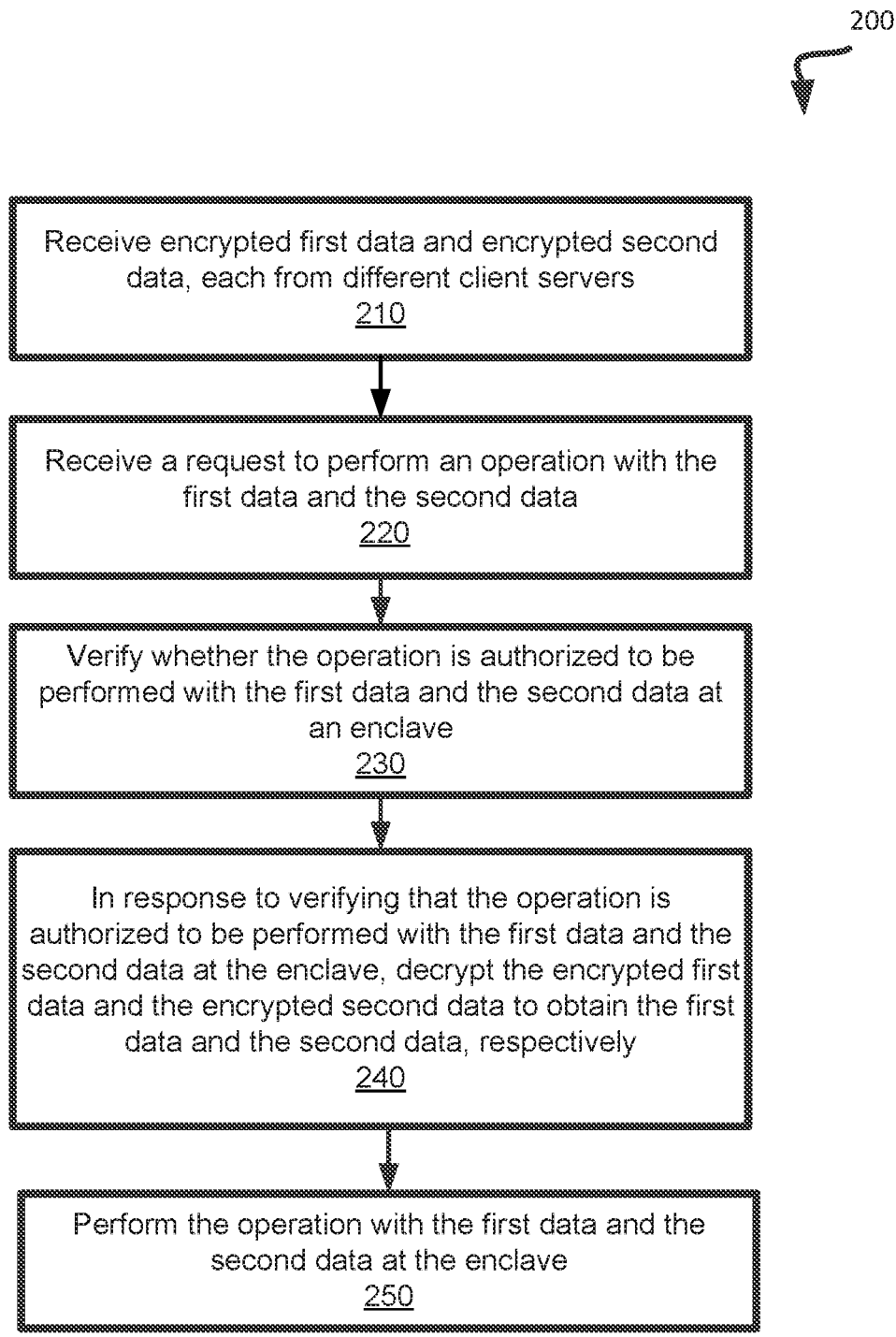
FIG. 2 is a flow diagram of an example method to securely perform an operation in accordance with some embodiments of the present disclosure.

FIG. 2 is a flow diagram of an example method 200 to securely perform an operation in accordance with some embodiments of the present disclosure. In general, the method 200 may be performed by processing logic that may include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 200 may be performed by the processing logic of the secure execution server 110 of FIG. 1.

For simplicity of explanation, the methods of the present disclosure are depicted and described as a series of acts. However, acts in accordance with the present disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media.

As shown in FIG. 2, the processing logic at operation 210 receives encrypted first data and encrypted second data, each from different client servers. In one implementation, the processing logic can receive encrypted first data from a client server (e.g., the client server 140A of FIG. 1) and encrypted second data from another client server (e.g., the client server 140Z). Further, one client server can have a restricted access (e.g., no access) to data from the other client server, and vice versa. Accordingly, the client servers should provide the respective data to an entrusted third party server in order to perform an operation on the two data. As an example, such data can be in a form of one or more database tables. The processing logic can receive such data in an encrypted form from a respective client server. For example, the client server can encrypt the data using an encryption key. The client server can store the encryption key at a remote system (e.g., the key management server 130 of FIG. 1). Then, the client server can transmit the encrypted data to the processing logic for a desired computation. In another implementation, the processing logic can receive more than two data from different client servers. The processing logic can perform operations 220 to 250 with the more than two data sets.

At operation 220, the processing logic receives a request to perform an operation with the first data and the second data. In some implementations, the processing logic can receive the request from one of the client servers (e.g., the client server 140A and 140Z) that provided the data to the processing logic. In other implementations, the processing logic can receive the request from a third-party client server that has not provided any of the data. The request can specify that the operation be performed at a secure environment (e.g., an enclave which will be described in details below). In a further implementation, the request can include attestation data (e.g., a digital signature) that can be used in verifying execution of the requested operation. An example of the operation to be performed with the two data can include combining the two data, determining common data entries in the two data, combining the two data while removing any overlapping data entries, and any other operations to process multiple sets of data.

At operation 230, the processing logic verifies whether the operation is authorized to be performed with the first data and the second data at an enclave. The enclave herein refers to a trusted application execution environment (e.g., an isolated memory region within a virtual address space of the processing logic that communicates with the client servers and executes the requested operation) for an application that prevents an untrusted part (e.g., a part of the processing logic communicating with the client servers) of the application executing outside the enclave from having access to a trusted part (e.g., a part of the processing logic for executing the requested operation) of the application and data at the enclave.

In one implementation, the processing logic can create a secure environment or initiate an enclave for the operation. The processing logic can provide, to another enclave or another system (e.g., the execution management server 120 of FIG. 1), attestation data associated with the operation. The attestation data can be associated with a hash value of an execution code of the operation. As an example, the processing logic can digitally sign the hash value of the execution code of the operation based on an internal cryptographic key (e.g. a private cryptographic key) associated with the processing logic or the enclave of the processing logic. Accordingly, the attestation data can correspond to a digital signature of the processing logic. Further, the processing logic can provide the attestation data to another system or another enclave. This enclave can be associated with another processing logic and/or with another system (e.g., the execution management server 120) that can validate or verify the attestation data.

In response, the processing logic can receive verification data of the attestation data from the other system or the other enclave. By receiving the verification data, the processing logic has proven that the enclave for the operation has been established in a secure hardware environment. As an example, the verification data can be a digital certificate verifying the digital signature. In a further example, the digital certificate can include a digital signature signed based on an internal cryptographic key (e.g., a private cryptographic key) associated with the other system (e.g., the execution management server 120) or the other enclave supported by the other system (e.g., the execution management server 120). In one implementation, the digital signature of the other system can be associated with the requested operation.

Based on the verification data, the processing logic can determine that the operation is authorized to be performed with the first data and the second data at the enclave. For example, the processing logic can validate the digital certificate. By validating the digital certificate, the processing logic can determine that that the operation is authorized to be performed with the first data and the second data at the enclave. If the processing logic cannot validate the digital certificate, the processing logic can determine that the operation should not be performed. Accordingly, the processing logic can notify the entity that requested execution of the operation. In case the received request includes the digital signature and the verification includes another digital signature, the processing logic can compare the two digital signatures. In response to determining that the two digital signatures match, the processing logic can determine that the operation is authorized to be performed with the first data and the second data at the enclave. In case the two digital signatures do not match, the processing logic can notify the entity that requested the operation that the operation cannot be performed with the two data in the secure environment.

In the alternative, or in addition, the processing logic can perform the verification operation based on a data policy at operation 230. For example, the processing logic can store or have access to data policies describing which operation can be performed on which data. In response to receiving the request to perform the operation, the processing logic can determine a data policy defining an authorized use of the operation specified in the request. Furthermore, the processing logic can determine whether the operation is authorized to be performed with the first data and the second data based on the data policy.

In response to verifying that the operation is authorized to be performed with the first data and the second data at the enclave, at operation 240, the processing logic decrypts the encrypted first data and the encrypted second data to obtain the first data and the second data, respectively. In some implementations, the processing logic can perform the decryption operation at the enclave to protect the decrypted data from being accessed by any untrusted part of the processing logic. In other implementations, the processing logic can decrypt the two data outside of the enclave.

In order to decrypt the two data, the processing logic can request a first encryption key for the encrypted first data and a second encryption key for the encrypted second data from a system (e.g., the key management server 130 of FIG. 1) that securely stores the first encryption key and the second encryption key (in some implementations, in an encrypted form). For example, the processing logic can provide the verification data to the system. Subsequently, the processing logic can receive the first encryption key and the second encryption key from the system. Then, the processing logic can decrypt the encrypted first data and the encrypted second data based on the first encryption key and the second encryption key, respectively.

At operation 250, the processing logic performs the operation with the first data and the second data at the enclave. In further implementations, the processing logic can provide an output of the operation to an entity that requested an execution of the operation. The processing logic can provide the output of the operation in an encrypted form. In one implementation, the processing logic can retrieve any key from the system storing keys for the encryption of the output data. Such output can, for example, be a list of common data entries of the two data, a merged data table, and etc. For example, the processing logic can use an encryption key that is associated with the entity that requested the execution of the operation to encrypt the output of the operation. In addition, the processing logic can store the output of the operation at the enclave.

Figure 3:
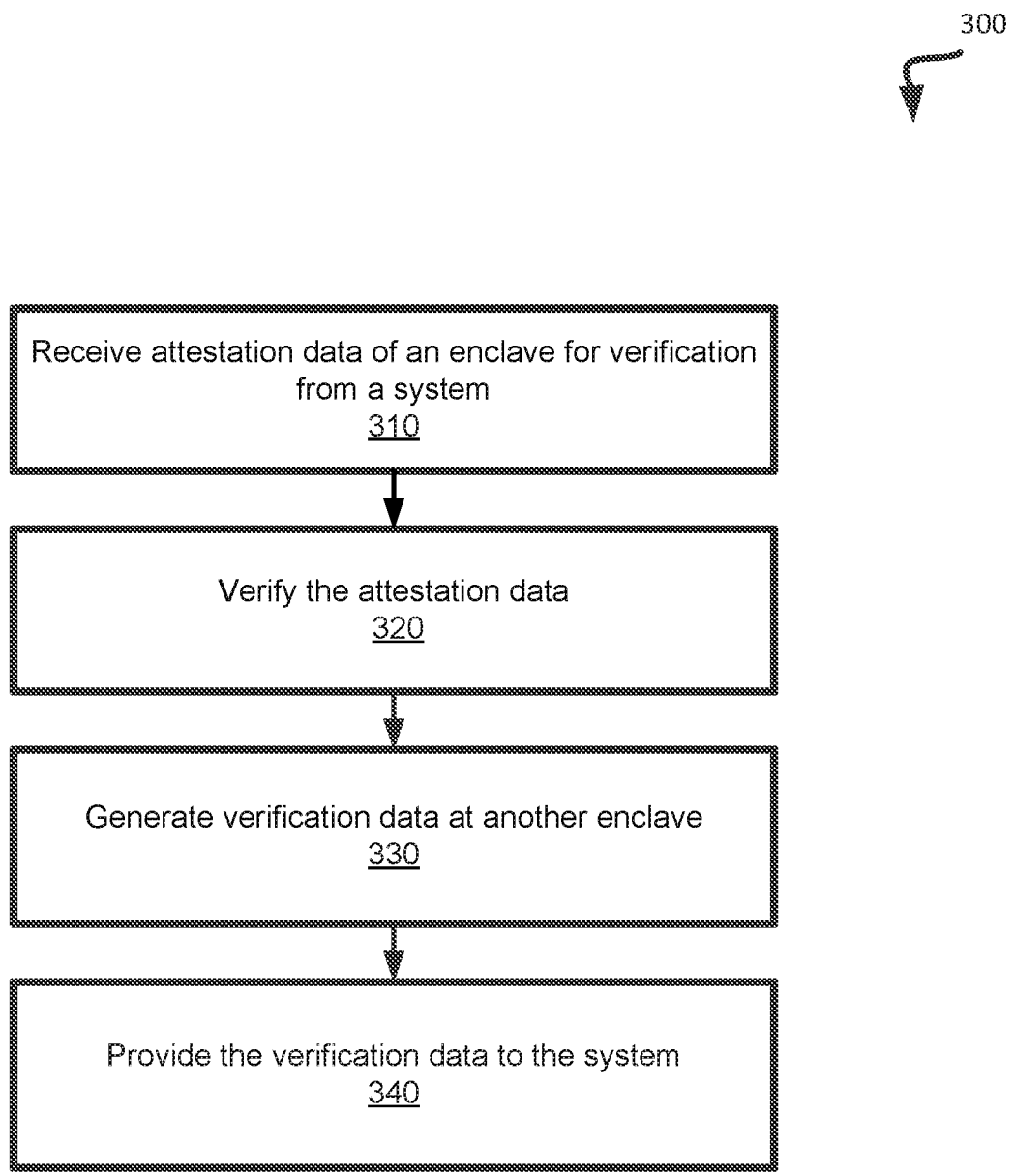
FIG. 3 is a flow diagram of an example method to attest an enclave in accordance with some embodiments of the present disclosure.

Furthermore, the processing logic can provide the output or result of the operation to an entity (e.g., a server or a mobile device). In an embodiment, in response to performing the operation at operation 250, the processing logic can provide the output of the operation to the client server that requested to perform the operation, for example at operation 220. In another embodiment, the processing logic can receive another request for the output of the operation from an entity (e.g., a server or a mobile device) that may be different from the one that requested the operation be performed. Accordingly, the processing logic can provide the output of the operation to the requesting entity. Yet in another embodiment, the processing logic can determine whether or not to provide the output of the operation to an entity in accordance with a policy. The processing logic can receive a policy along with the request to perform an operation with the first data and the second data at operation 220 or at any other point in time. For example, a policy can specify that a result of an operation should be provided only to an entity that has requested the respective operation to be performed (for example, the client server from operation 220). As another example, a policy can dictate that only a specific personnel (e.g., an administrator, a board of director) can receive an output of an operation performed at operation 250. Such a policy can further list an identifier (e.g., a user identifier, email address, or an internet protocol (IP) address) of the specific personnel. Accordingly, once the processing logic finishes performing operation 250 or receives another request to provide the output of the requested operation, the processing logic can identify any policy related to the operation. Subsequently, the processing logic can determine from the policy whether or not and also, to whom to provide the output of the operation. FIG. 3 is a flow diagram of an example method 300 to attest an enclave in accordance with some embodiments of the present disclosure. In general, the method 300 may be performed by processing logic that may include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 300 may be performed by the processing logic of the execution management server 120 of FIG. 1.

As shown in FIG. 3, at operation 310, the processing logic receives attestation data of an enclave for verification from a system. For example, the processing logic can receive a digital signature from a system (e.g., the secure execution server 110 of FIG. 1). Such digital signature can be associated with an operation that is being challenged as to whether the operation should be executed in a secure environment (e.g., an enclave) supported by the system (e.g., the secure execution server 110). The digital signature can correspond to a hash value of an execution code of the operation that is signed based on an internal cryptographic key (e.g., a private cryptographic key) of the system (e.g., the secure execution server 110). At operation 320, the processing logic can verify the attestation data. In one implementation, the processing logic can verify the digital signature based on a public cryptographic key that is paired with the internal cryptographic key of the system (e.g., the secure execution server 110).

Once the processing logic verifies the attestation data, at operation 330, the processing logic issues or generates verification data at another enclave (e.g., an enclave of the execution management server 120) that is different from the enclave (e.g., the enclave of the secure execution server 110) that is associated with the received attestation data. As an example, the processing logic can issue a digital certificate for the attestation data. In one implementation, the processing logic can generate the digital certificate at the enclave (e.g., an enclave of the execution management server 120)

of the processing logic. In one implementation, the processing logic can include, in the digital certificate, a digital signature signed based on an internal cryptographic key (e.g., a private cryptographic key) associated with the processing logic (e.g., the execution management server 120) or the enclave supported by the processing logic (e.g., the execution management server 120). Such digital signature can be associated with the operation with which the attestation data received at operation 310 is associated. By issuing the verification data, the processing logic confirms that a secure environment (e.g., an enclave at the secure execution server 110) has been established for the operation. At operation 340, the processing logic provides the verification data to the system (e.g., the secure execution server 110).

In some implementations, the processing logic can generate attestation data that is associated with an operation that is to be performed later in a secure environment (e.g., an enclave of the secure execution server 110) that is not supported by the processing logic. The processing logic can provide the attestation data to one of the client servers (e.g., the client server 140A-140Z of FIG. 1) that requests an execution of the operation at a secure environment. As an example, the attestation data can be a digital signature that is associated with an execution code of the operation (e.g., the operation associated with the two data in FIG. 2) and that is signed by a an internal cryptographic key (e.g., a private cryptographic key) of the system (e.g., the execution management server 120) supporting the processing logic. Moreover, the processing logic can generate the digital signature at the enclave of the processing logic. In such a case, the processing logic can sign the execution code of the operation based on the cryptographic key associated with the enclave of the processing logic.

Figure 4:
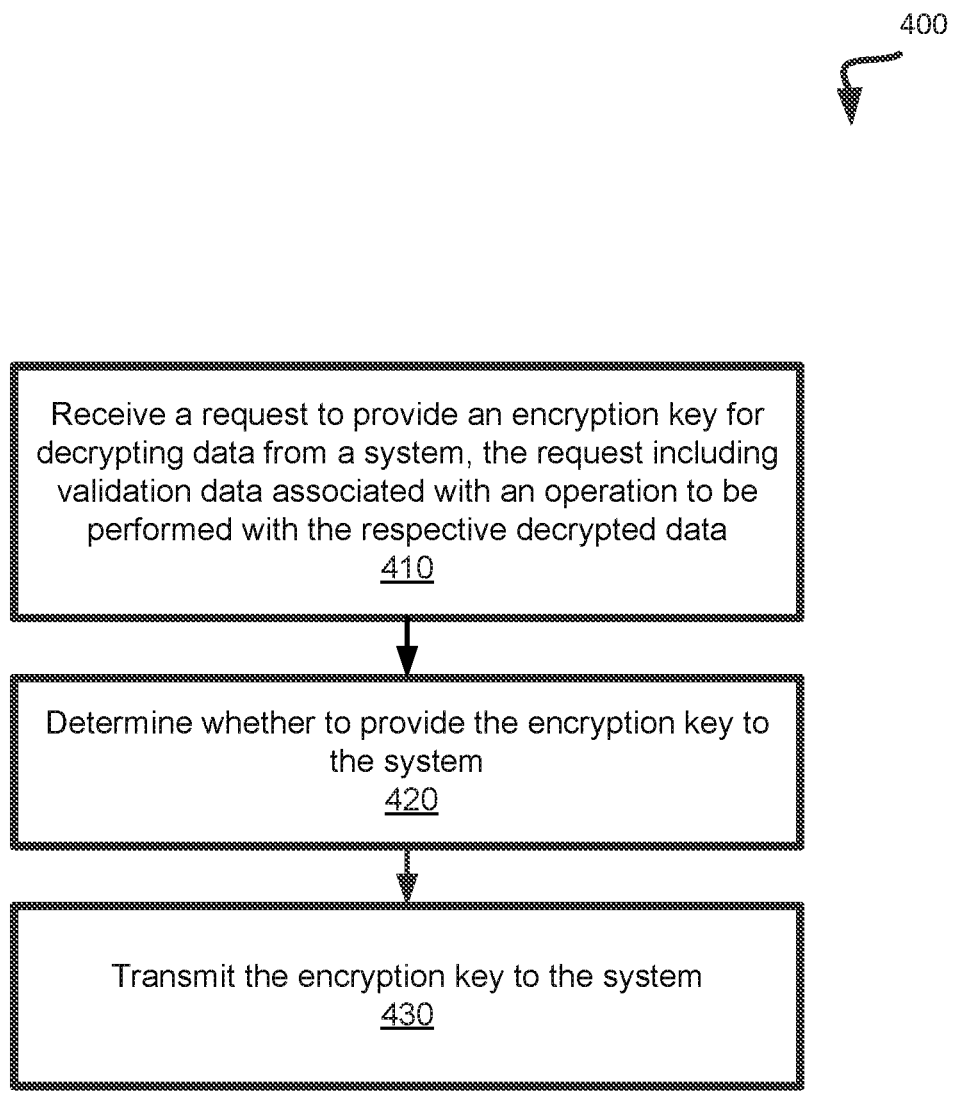
FIG. 4 is a flow diagram of an example method to provide an encryption key in accordance with some embodiments of the present disclosure.

FIG. 4 is a flow diagram of an example method 400 to provide an encryption key in accordance with some embodiments of the present disclosure. In general, the method 400 may be performed by processing logic that may include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 400 may be performed by the processing logic of the key management server 112 of FIG. 1.

As shown in FIG. 4, at operation 410, the processing logic receives a request to provide an encryption key for decrypting data from a system (e.g., the secure execution server 110 of FIG. 1). The received request can include a key identifier of the encryption key. In one implementation, the request can further include validation data associated with an operation to be performed with the respective decrypted data. Such validation data can correspond to the validation data issued by the execution management server 120. That is, the validation data has been used by the encryption key requesting system (e.g., the secure execution server 110) to verify that a secure environment (e.g., an enclave) has been established to perform the operation with the decrypted data. Such validation data can include identity data of the issuing authority (e.g., an identifier of the execution management server 120). In addition, the validation data can include a digital signature of the issuing authority (e.g., the execution management server 120) of the validation data.

At operation 420, the processing logic determines whether to provide the encryption key to the system (e.g., the secure execution server 110) in view of a corresponding data policy and the validation data. The processing logic can perform operation 420 in a secure environment (e.g., an enclave). In one implementation, the processing logic can identify a data policy that corresponds to the requested encryption key for a data store storing data policies of encryption keys. For example, the processing logic can use the key identifier included in the request to query appropriate data policy in the data store. The processing logic can manage the data store for data policy associated with encryption keys stored at the system (e.g., the key management server 130 of FIG. 1) of the processing logic. The encryption keys may be securely stored (e.g., encrypted) at the server (e.g., the key management server 130). In one implementation, the processing logic can add or modify data policy that specifies when and to whom the respective encryption key should be provided when receiving a request to store an encryption key.

For example, the data policy can describe that an encryption key is to be provided to any entity that provides validation data issued by a particular issuing authority (e.g., the execution management server 120). In such an example, the processing logic can identify the issuing authority from the validation data based on the identity data included in the validation data. In case the processing logic determines the issuing authority of the validation data satisfies the condition specified in the corresponding data policy, the processing logic can determine that the respective encryption key should be provided to the requesting party. Otherwise, the processing logic can determine not to provide the encryption key and notify the system accordingly.

Additionally or alternatively, the data policy can specify that an encryption key should be released when a digital signature is received. The data policy can further specify that the digital signature should be associated with a particular operation and signed by a specific entity. In this instance, the processing logic can determine whether the received validation data includes the digital signature specified by the corresponding data policy. The processing logic can further verify the digital signature using a public encryption key that is paired with a private encryption key used in generating the signature. In response to determining that the processing logic has received the digital signature described in the data policy, the processing logic can determine that the encryption key should be transmitted to the requesting system (e.g., the secure execution server 110). In response to determining to provide the encryption key, at operation 430, the processing logic transmits the encryption key to the system.

Figure 5:
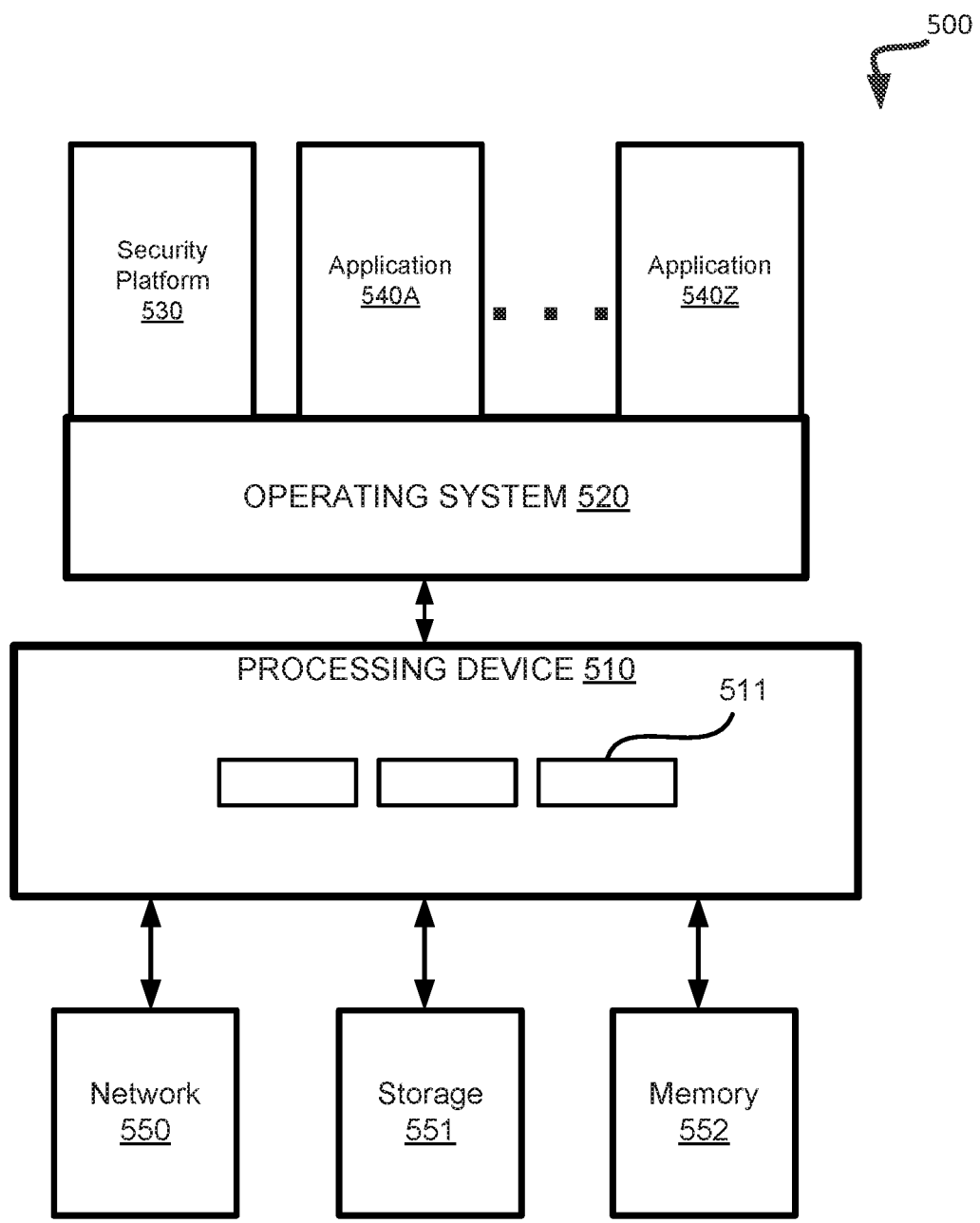
FIG. 5 illustrates an example server that provides secure computation of multiparty data in accordance with some embodiments of the present disclosure.

FIG. 5 illustrates an example server that provides secure computation of multiparty data in accordance with some embodiments of the present disclosure. In general, the secure execution server 110, the execution management server 120, or the key management server 130 of FIG. 1 may correspond to a network server that provides cryptographic operations for one or more other applications 540A to 540Z that are also hosted by the network server or another network server.

As shown in FIG. 5, the network server 500 may include a processing device 510 that may execute an operating system 520. Furthermore, the processing device 510 may include one or more internal cryptographic keys 511 that may be used to encrypt and decrypt data stored in a portion of a memory that is assigned to a secure enclave associated with a security platform 530. The access to the data of the security platform 530 in the secure enclave (e.g., data stored at a storage resource) may be protected from the one or more applications 540A to 540Z and the operating system 520. For example, the access to the data of the secure enclave corresponding to the security platform 530 may be protected by the use of one of the internal cryptographic keys 511 (e.g., the secure enclave key or a master key) that are internal to the processing device 510 so that the access to the data is based on a hardware access as opposed to a software access. The operating system 520 may be associated with a first privilege level and the security platform 530 and the applications 540A to 540Z may be associated with a second privilege level where the first privilege level of the operating system is more privileged than the second privilege level of the various applications that are run on the operating system 520 (e.g., the more privileged level allows access to more resources of the network server than the less privileged level). Thus, the operating system 520 may be allowed access to resources of the applications 540A to 540Z. However, since the security platform 530 is assigned to a secure enclave where access to the data of the secure enclave is based on the use of an internal cryptographic key 511 of the processing device 511, the operating system 520 may not be able to access the data of the security platform 530 despite having a more privileged level of access than the security platform 530. The master key that is used to decrypt data at the storage resource may be an internal cryptographic key 511.

In operation, the security platform 530 may be hosted on the network server with the applications 540A to 540Z. In one embodiment, the server may perform an operation in a secure environment, such as an enclave, after verifying that the operation is authorized to be performed in the secure environment. The application 540A may correspond to functionality of a part of the server. For example, the application 540A may perform a function, as instructed by the processing device 510, that may communicate with a client server (e.g., the client server 140A of FIG. 1) to receive encrypted data and a request to perform operation on multiparty data and also, provide an output of the operation. Moreover, the secure platform 530 may provide functionality of another part of the secure execution. As an example, the secure platform 530 may support a function that verifies that the requested operation is to be performed at an enclave associated with the secure platform 530 by using attestation data and corresponding verification data. The secure platform 530 may also provide a function that may securely execute or perform the verified operation at the enclave associated with the secure platform 530.

In another embodiment, the server may support verification of secure computation of multiparty data. In some implementations, the application 540B may correspond to such functionality. In other implementations, the secure platform 530 may support such functionality.

Yet in another embodiment, the server may securely manage encryption keys along with any data policies associated with the encryption keys. In some implementations, the application 540C may correspond to the functionality. In other implementations, the secure platform 530 may provide the functionality.

As such, a network server may provide functionality of the secure execution server 110, the execution management server 120, and the key management server 130 described above with respect to FIG. 1, along with any applications that may support the functionality of the various systems for providing secure computation of multiparty data as described herein. Although FIG. 5 illustrates that the network server supports functionality of the secure execution server 110, the execution management server 120, and the key management server 130 of FIG. 1 in association with an application 540A to 540Z, any of the three functionality may alternatively be provided by another network server or may be supported by another network server that is external to any data center or network cluster that includes the network servers hosting applications 540A to 540Z.

Figure 6:
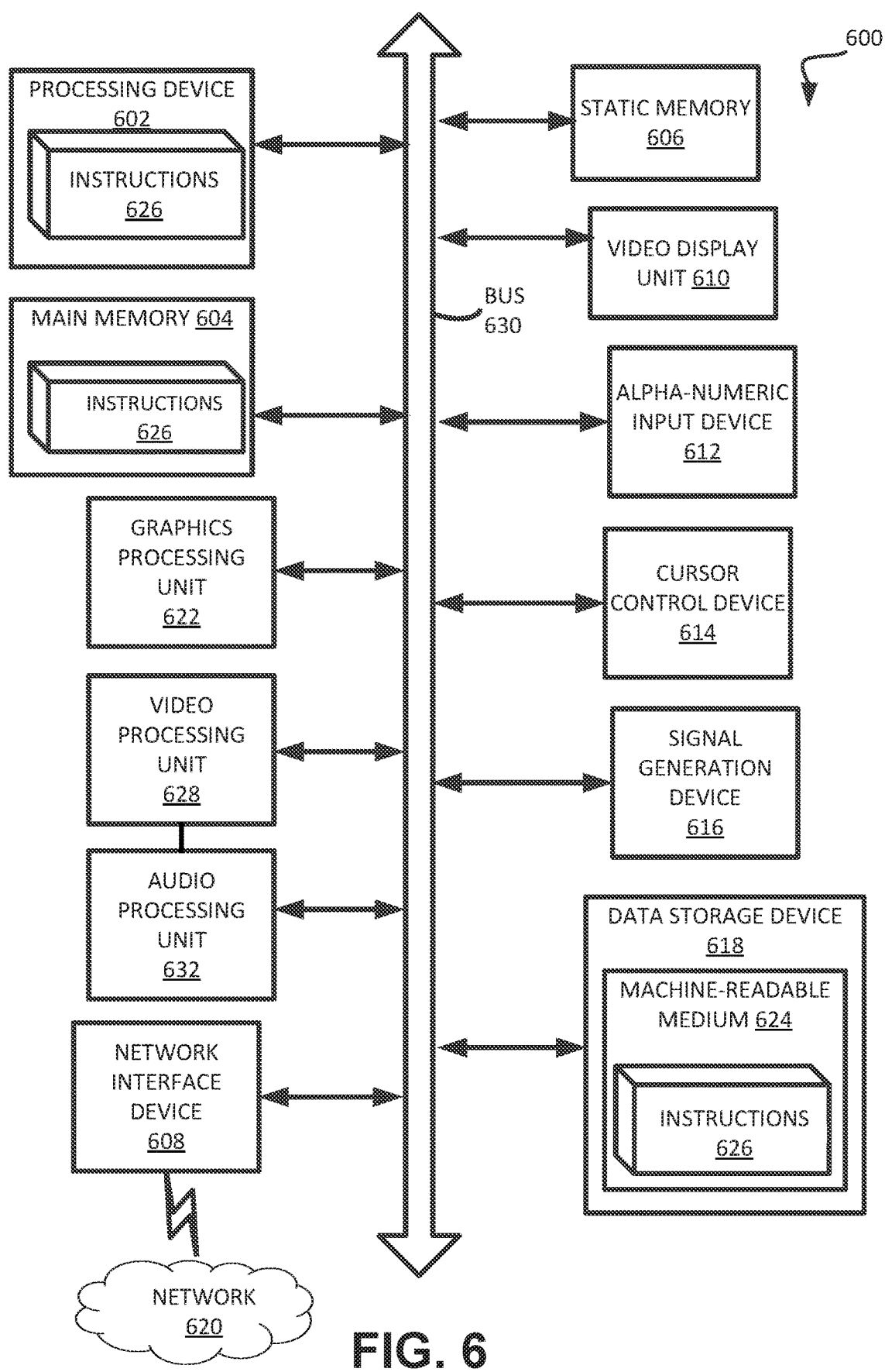
FIG. 6 illustrates an example computer system in which embodiments of the present disclosure operate.

FIG. 6 illustrates an example machine of a computer system within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM), etc.), a static memory 606 (e.g., flash memory, static random access memory (SRAM), etc.), and a data storage device 618, which communicate with each other via a bus 630.

Processing device 602 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. The processing device 602 is configured to execute instructions 626 for performing the operations and steps discussed herein.

The computer system 600 may further include a network interface device 708 to communicate over the network 620. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), a graphics processing unit 622, a signal generation device 616 (e.g., a speaker), graphics processing unit 622, video processing unit 628, and audio processing unit 632.

The data storage device 618 may include a machine-readable storage medium 624 (also known as a computer-readable medium) on which is stored one or more sets of instructions or software 626 embodying any one or more of the methodologies or functions described herein. The instructions 626 may also reside, completely or at least partially, within the main memory 604 and/or within the processing device 602 during execution thereof by the computer system 600, the main memory 604 and the processing device 602 also constituting machine-readable storage media.

In one implementation, the instructions 626 include instructions to implement functionality as described herein. While the machine-readable storage medium 624 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing certain terms may refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the method. The structure for a variety of these systems will appear as set forth in the description below. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. The disclosure and drawings are, accordingly, to be regarded in an illustrative sense rather than a restrictive sense.

What is claimed is:

1. A method comprising:
   receiving encrypted first data and encrypted second data, each data being received from a different client server;
   receiving a request to perform an operation with the first data and the second data;
   verifying, by a processing device, whether the operation is authorized to be performed with the first data and the second data at a first enclave, wherein the verifying comprises:
      receiving verification data of attestation data associated with the operation from a second enclave, and
      determining, based on the verification data, that the operation is authorized to be performed with the first data and the second data at the first enclave;
   in response to verifying that the operation is authorized to be performed with the first data and the second data at the first enclave, decrypting the encrypted first data and the encrypted second data to obtain the first data and the second data, respectively; and
   performing, at the first enclave, the operation with the first data and the second data.

2. The method of claim 1, wherein the decrypting of the encrypted first data and the encrypted second data comprises:
   requesting a first encryption key for the encrypted first data and a second encryption key for the encrypted second data by providing the received verification data to a system securely storing the first encryption key and the second encryption key;
   receiving the first encryption key and the second encryption key from the system; and
   decrypting the encrypted first data and the encrypted second data based on the first encryption key and the second encryption key, respectively.

3. The method of claim 1, wherein the attestation data is further associated with a hash value of an execution code of the operation.

4. The method of claim 1, wherein the determining, based on the verification data, that the operation is authorized to be performed with the first data and the second data at the first enclave comprises:

determining a second attestation data of the received request;
determining a third attestation data of the verification data; and
determining whether the second attestation data matches the third attestation data.

5. The method of claim 1, wherein the receiving of the encrypted first data and the encrypted second data comprises:
receiving the encrypted first data from a first client server, wherein the first client server has a restricted access to the second data; and
receiving the encrypted second data from a second client server, wherein the second client server has a restricted access to the first data.

6. The method of claim 1, wherein the verifying of whether the operation is authorized to be performed with the first data and the second data at the first enclave comprises:
determining a data policy defining an authorized use of the operation; and
determining whether the operation is authorized to be performed with the first data and the second data based on the data policy.

7. A system comprising:
a memory; and
a processing device, operatively coupled with the memory, to:
receive encrypted first data and encrypted second data, each data being received from different client server;
receive a request to perform an operation with the first data and the second data;
verify whether the operation is authorized to be performed with the first data and the second data at a first enclave, wherein the verifying comprises:
receiving verification data of attestation data associated with the operation from a second enclave, and
determining, based on the verification data, that the operation is authorized to be performed with the first data and the second data at the first enclave;
in response to verifying that the operation is authorized to be performed with the first data and the second data at the first enclave, decrypt the encrypted first data and the encrypted second data to obtain the first data and the second data, respectively; and
perform, at the first enclave, the operation with the first data and the second data.

8. The system of claim 7, wherein to decrypt the encrypted first data and the encrypted second data, the processing device is to:
request a first encryption key for the encrypted first data and a second encryption key for the encrypted second data by providing the received verification data to another system securely storing the first encryption key and the second encryption key;
receive the first encryption key and the second encryption key from the another system; and
decrypt the encrypted first data and the encrypted second data based on the first encryption key and the second encryption key, respectively.

9. The system of claim 7, wherein the attestation data is further associated with a hash value of an execution code of the operation.

10. The system of claim 7, wherein to determine, based on the verification data, that the operation is authorized to be performed with the first data and the second data at the first enclave, the processing device is to:

determine a second attestation data of the received request;
determine a third attestation data of the verification data; and
determine whether the second attestation data matches the third attestation data.

11. The system of claim 7, wherein to receive the encrypted first data and the encrypted second data, the processing device is to:
receive the encrypted first data from a first client server, wherein the first client server has a restricted access to the second data; and
receive the encrypted second data from a second client server, wherein the second client server has a restricted access to the first data.

12. The system of claim 7, wherein to verify whether the operation is authorized to be performed with the first data and the second data at the second enclave, the processing device is to:
determine a data policy defining an authorized use of the operation; and
determine whether the operation is authorized to be performed with the first data and the second data based on the data policy.

13. A non-transitory computer readable medium comprising data that, when accessed by a processing device, cause the processing device to perform operations comprising:
receiving encrypted first data and encrypted second data, each data being received from different client server;
receiving a request to perform an operation with the first data and the second data;
verifying whether the operation is authorized to be performed with the first data and the second data at a first enclave, wherein the verifying comprises:
receiving verification data of attestation data associated with the operation from a second enclave, and
determining, based on the verification data, that the operation is authorized to be performed with the first data and the second data at the first enclave;
in response to verifying that the operation is authorized to be performed with the first data and the second data at the first enclave, decrypting the encrypted first data and the encrypted second data to obtain the first data and the second data, respectively; and
performing, at the first enclave, the operation with the first data and the second data.

14. The non-transitory computer readable medium of claim 13, wherein the decrypting of the encrypted first data and the encrypted second data comprises:
requesting a first encryption key for the encrypted first data and a second encryption key for the encrypted second data by providing the received verification data to a system securely storing the first encryption key and the second encryption key;
receiving the first encryption key and the second encryption key from the system; and
decrypting the encrypted first data and the encrypted second data based on the first encryption key and the second encryption key, respectively.

15. The non-transitory computer readable medium of claim 13, wherein the attestation data is further associated with a hash value of an execution code of the operation.

16. The non-transitory computer readable medium of claim 13, wherein the determining, based on the verification data, that the operation is authorized to be performed with the first data and the second data at the first enclave comprises:

determining a second attestation data of the received request;

determining a third attestation data of the verification data; and determining whether the second attestation data matches the third attestation data.

17. The non-transitory computer readable medium of claim 13, wherein the receiving of the encrypted first data and the encrypted second data comprises:

receiving the encrypted first data from a first client server, wherein the first client server has a restricted access to the second data; and receiving the encrypted second data from a second client server, wherein the second client server has a restricted access to the first data.

\* \* \* \* \*